F. F. KINNEY.
RECORDING WATTMETER.
APPLICATION FILED MAY 13, 1907.

1,060,984.

Patented May 6, 1913.
5 SHEETS—SHEET 4.

Witnesses:

Inventor
Frank F. Kinney

E. F. KINNEY.
RECORDING WATTMETER.
APPLICATION FILED MAY 13, 1907.

1,060,984.

Patented May 6, 1913.
5 SHEETS—SHEET 5.

Witnesses:

Inventor
Frank F. Kinney

UNITED STATES PATENT OFFICE.

FRANK F. KINNEY, OF CHICAGO, ILLINOIS, ASSIGNOR, BY MESNE ASSIGNMENTS, TO CHICAGO ELECTRIC METER COMPANY, OF CHICAGO, ILLINOIS, A CORPORATION OF ILLINOIS.

RECORDING-WATTMETER.

1,060,984.  Specification of Letters Patent.  Patented May 6, 1913.

Application filed May 13, 1907. Serial No. 373,523.

*To all whom it may concern:*

Be it known that I, FRANK F. KINNEY, a citizen of the United States, residing at Chicago, in the county of Cook and State of Illinois, have invented a certain new and useful Improvement in Recording-Wattmeters, of which the following is a full, clear, concise, and exact description, reference being had to the accompanying drawings, forming a part of this specification.

My invention relates to wattmeters, and especially to an integrating wattmeter,—that is to say, a wattmeter which automatically sums up or totals the amount of energy passing through it. This wattmeter, it will be understood, differentiates from a mere indicating wattmeter in that it at all times shows the total amount of energy which has passed through the meter since a given period of time; whereas the indicating wattmeter merely indicates the amount of energy passing through at the instant the reading is taken.

The object of the invention is to arrange for the automatic recording of the integrations or readings of the meter at different predetermined periods of time.

Other objects of the invention are to provide simple and practical mechanism for carrying out this result, and to secure the foregoing and other desirable results in a simple and expeditious manner.

In the recording wattmeter herein set forth, I provide integrating wattmeter mechanism in combination with suitable printing mechanism by which the integrations of the meter can be printed, and clock mechanism combined with an electrical circuit and circuit-closing and opening devices by which the printing mechanism is actuated to print the integrations of the meter at certain predetermined and desired periods of time.

Figure 1:
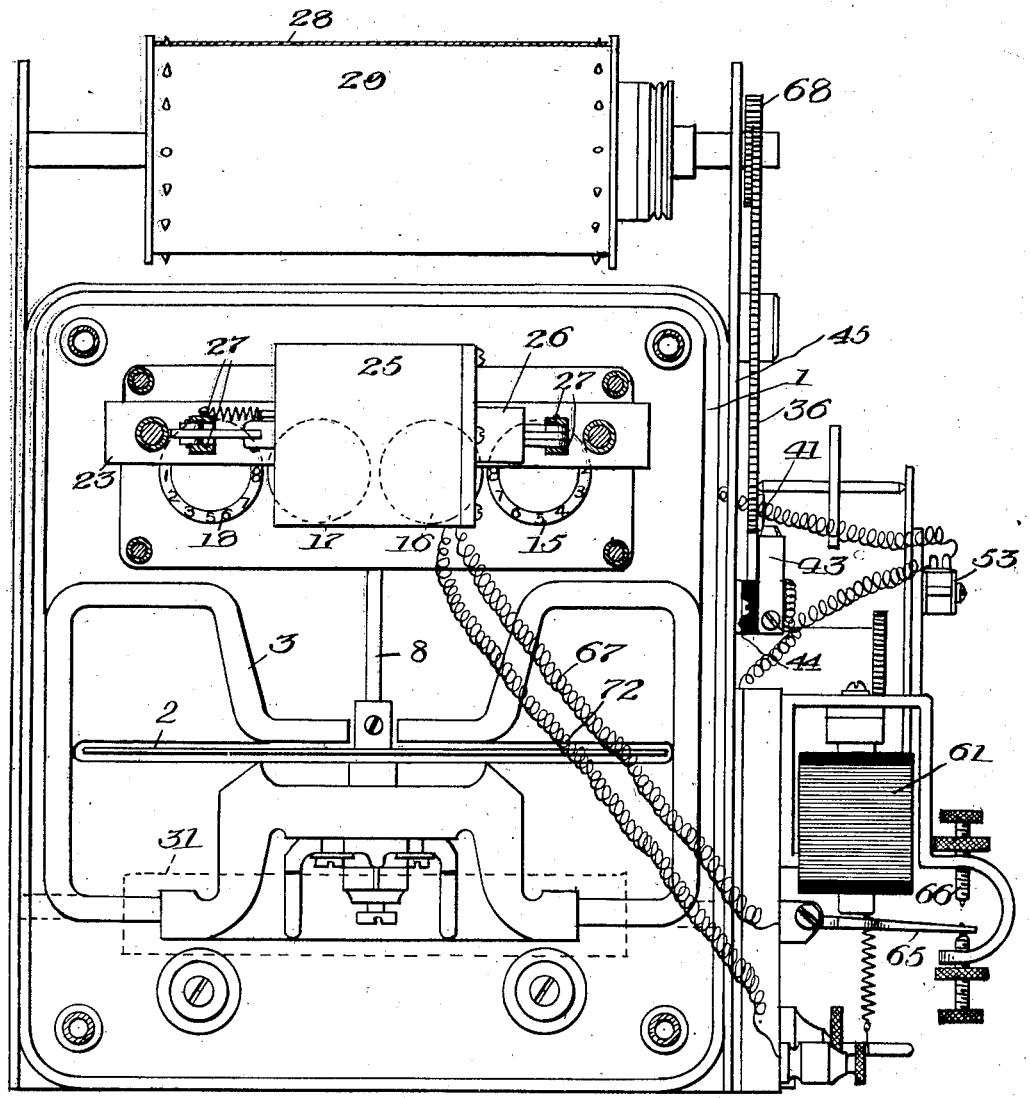
Figure 2:
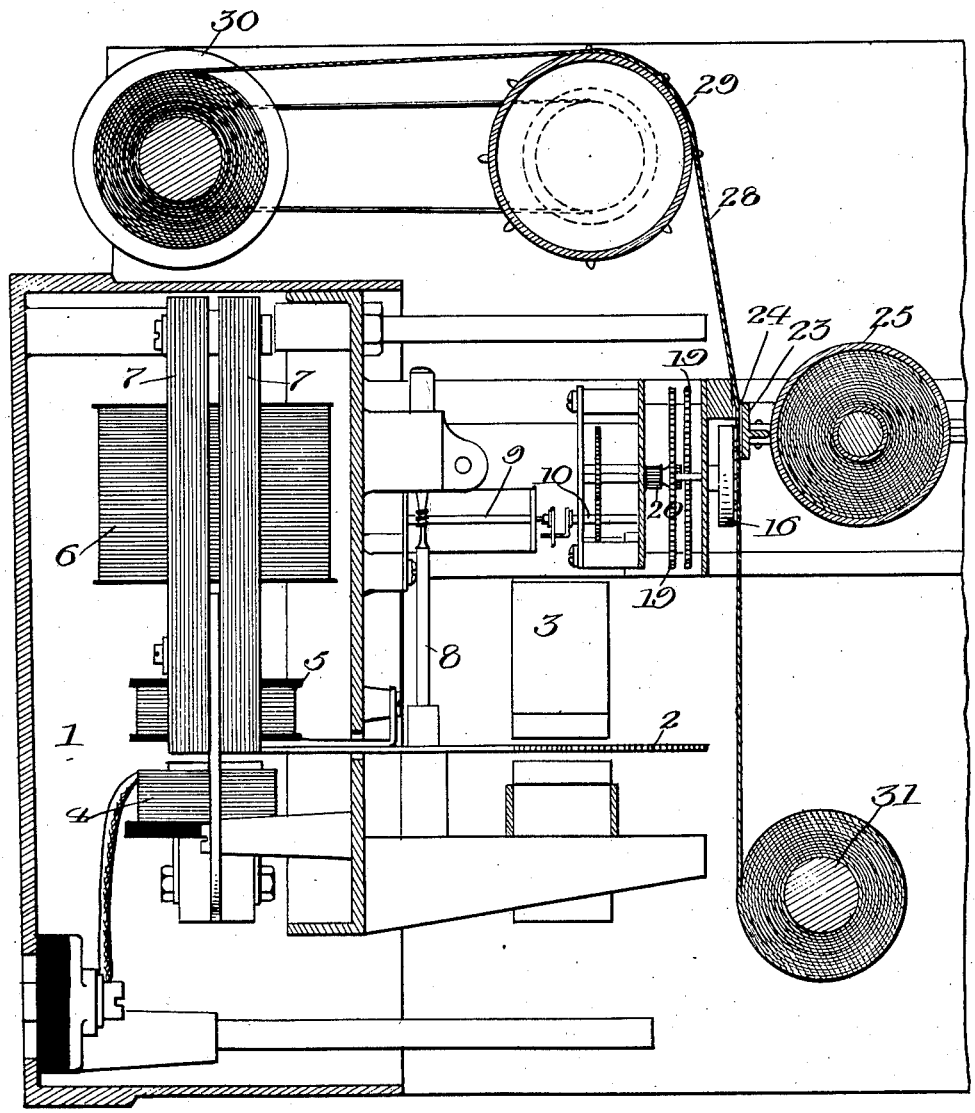
Figure 3:
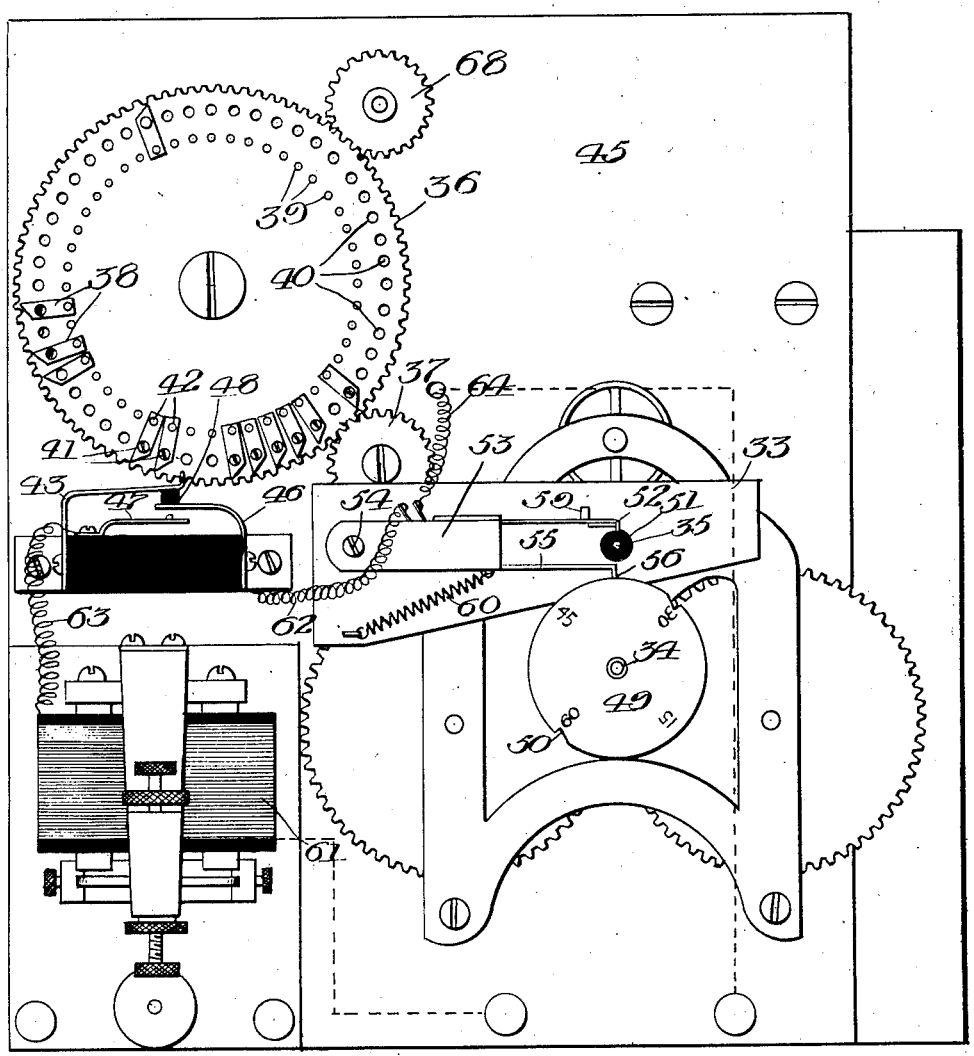
Figure 4:
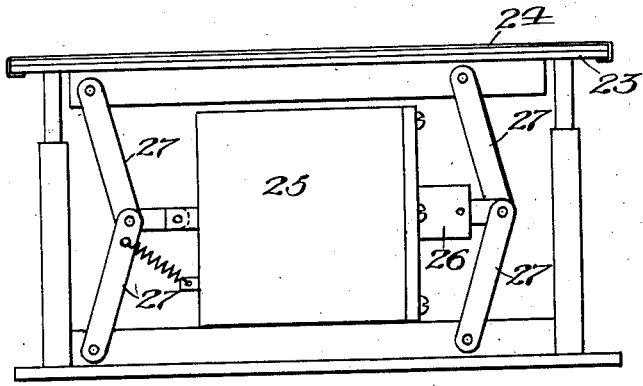
Figure 5:
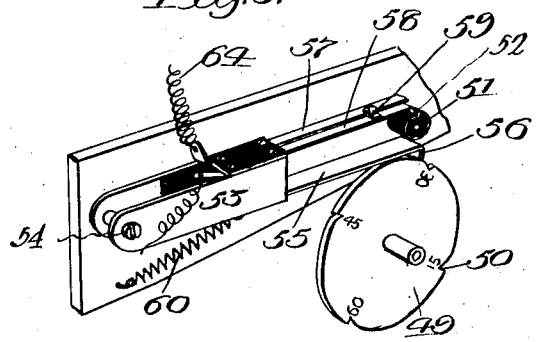
Figure 6:
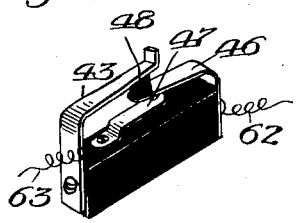
Figure 7:
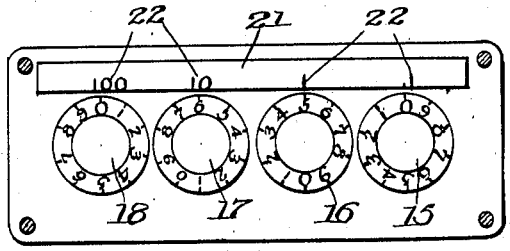
Figure 8:
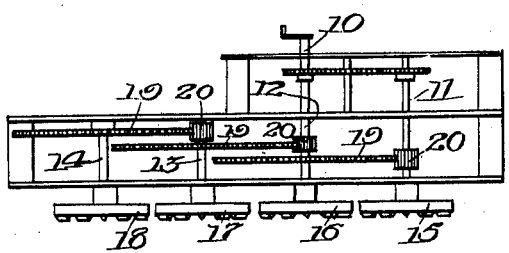
Figure 9:
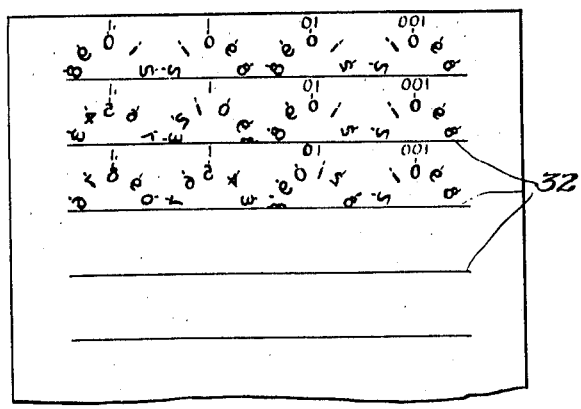

In the accompanying drawings, Figure 1 is a front elevation of a recording wattmeter embodying my invention; Fig. 2 is a side elevation of the same; Fig. 3 is a view of the side opposite that shown in Fig. 2; Fig. 4 is a view of the printing mechanism of the meter; Figs. 5 and 6 are views of circuit-closing devices; Fig. 7 is a view of the printing wheels which show the integrations of the meter; Fig. 8 is a plan view of the wheels shown in Fig. 7, together with gearing for operating the same; and Fig. 9 is a view of a portion of the record sheet on which the record is made.

Referring to the drawings, and especially to Figs. 1, 2 and 3, I show an integrating wattmeter of well known construction, comprising a substantially rectangular casing 1 in which are mounted the usual rotary disk 2, permanent retarding magnets 3, 3 associated therewith, a current coil 4 (Fig. 2), a potential coil 5, and reactance coils 6, the latter being mounted in laminated iron uprights 7, 7. The disk 2 carries a spindle 8 which has a worm gear connection with a horizontal spindle 9 which is in turn connected with a rotary spindle 10 (Figs. 2 and 8), which spindle is connected by gearing with another rotary spindle 11, which latter is one of four spindles 11, 12, 13 and 14 carrying wheels 15, 16, 17 and 18 (Fig. 7). The spindles 11, 12, 13 and 14 are geared together by gears 19 and pinions 20 so that each is driven by the other in succession. The type wheels 15, 16, 17 and 18 each has figures from zero to 9 inclusive, and the gearing is such that each one rotates ten times for one rotation of the wheel to the left of it. Above these wheels is a strip 21 provided with types 22, 22 which are respectively as follows: .1, 1, 10 and 100, each figure or set of figures being above one of the wheels so that the wheels indicate respectively,—the wheel 15—.1; the wheel 16—units; the wheel 17—10s; and the wheel 18—100s of watts. For printing upon these wheels I have shown a platen 23 (Fig. 2) carrying an inking rubber 24 and a solenoid 25 (Fig. 4) having a core 26 connected by links 27, 27 with the platen 23, so that when the solenoid is energized, the core 26 will be attracted and the links 27, 27 straightened so as to force the platen 23 toward and against the type wheels 15, 16, 17 and 18. A sheet or strip of paper 28 is arranged between the inking rubber 24 and the type wheels, so that when the solenoid is energized, and the inking platen actuated, the record of the wheels will be printed upon the sheet of paper, it being observed that the platen is arranged against the uppermost part of the type wheels so that only the uppermost numerals of each wheel, together with the numbers 22, are printed. This record is stamped upon the face of the record strip, as shown in Fig. 9, in the reverse order to the sequence of the printing wheels and the numerals upon said wheels shown, in Fig. 7; by looking through the record strip from the back, however, the record in its proper sequence may be read, or, if the record strip 28 be of comparatively thin paper, the impression of the numerals on the back of the record strip will be sufficient to permit reading the record directly in proper sequence from said impression. The strip of paper 28 is extended over a feed roller 29 and thence to a storage roller 30, and is led from a supply roll or spindle 31 so that the strip will be fed by the roll 29 from the roll 31 to the roll 30, passing through the printing mechanism during its movement. This strip or sheet of paper is desirably provided with cross lines 32 (Fig. 9) which indicate intervals of time; in the strip shown these cross lines indicate half hour intervals.

As an arrangement for operating the printing mechanism at desired periods of time, I show a clock-work 33 (Fig. 3) which can be of any suitable construction, and which of itself forms no part of my present invention. The clock-work shown has a spindle 34 corresponding to the spindle carrying the minute wheel of a watch or clock, and therefore rotating once each hour. There is also a spindle 35 corresponding to the spindle carrying the second wheel of a watch or clock and thus rotates once each minute. The spindle 34 will therefore be called the minute spindle and the spindle 35 the second spindle. I also provide a wheel 36 which is geared to the clock-work by means of pinion 37 in such a way that the wheel 36 rotates once each twenty-four hours and therefore may be called the hour wheel. I provide contact devices for these rotary members so that contacts can be closed at any predetermined hour, minute and second. The arrangement I have shown for carrying this out comprises a series of contact-makers 38 mounted upon the wheel 36 and made removable and adjustable thereon, a simple arrangement being to provide said wheel with a series of apertures 39 and 40 arranged in pairs at intervals around the wheel 36, the wheel being provided with forty-eight such pairs altogether so that each one represents an interval of one-half hour. The contact makers 38 are then secured in position by means of small screws 41, and pins 42 engaging the apertures 40 and 39. As many contact-makers as desired are employed so that the device may be actuated at each half hour or as many half hours as desired. If desired to actuate the device and take a record oftener than half an hour, the wheel 36 would be provided with more pairs of apertures according to requirements,—for instance twice as many if fifteen minute records were desired.

A spring strip 43 mounted upon a bracket 44 secured to a plate 45 forming one side of the device and supporting the wheel 36 is arranged to meet and be actuated by the contact-makers 38, 38 as the same pass by. A pair of contact strips 46, 47 are also mounted upon the bracket 44 and arranged to make contact with one another when the uppermost strip 46 is depressed by the spring strip 43, the strip 46 being provided with an insulation lug 48 against which the spring 43 operates. The contact makers 38 are desirably opened at their outer ends so that the strip 43 is actuated and a contact made by strips 46 and 47 but a relatively short period of time.

The minute spindle 34 is provided with a disk 49 which has notches 50 in its periphery at intervals, the number shown being two, separated from one another by 180 degrees. The second spindle 35 carries a hub 51 having a peripheral shoulder 52. A contact arm 53 (Fig. 5) is pivotally mounted at 54 and provided with a strip 55 which rests upon the periphery of the minute disk 49 and drops into the notches 50 as the same come under its bent end 56. A pair of contacts 57, 58 are mounted upon the contact arm 53 and arranged to rest upon the hub 51 on the spindle 35. These two contact strips are insulated from one another and from the strip 55, the contact arm 53 being made of insulating material. The contact strip 57 is longer than the strip 58 and the strip 58 carries a small contact member or piece 59 which is adapted to make contact with the strip 57 when the strip 58 is lower than the strip 57. Thus it will be seen that in the operation of this part of the mechanism, the strip 55 will normally maintain the contact arm 53 in an upper position against the tension of a spring 60, so that the rotation of the hub 51 will have no effect upon the contacts 57 and 58 for the reason that these contacts are not subject to pressure tending to depress them when the shoulder 52 passes under them. However when one of the notches 50 in the disk 49 comes under the end 56 of the strip 55, the strip 55 with the contact arm 53 is lowered by the spring 60, thereby tending to draw the contact strips 57 and 58 down. So long as the hub 51 holds the strips 57 and 58 in an upper position no contact will be made, but when the shoulder 52 passes under the shorter strip 58 that strip is lowered while the strip 57 remains in an upper position and the contact 59 on the strip 58 comes into contact with and presses against the strip 57. As soon as the hub 51 is turned a sufficient amount further, the shoulder 52 passes the end of the strip 57 also, thereby permitting that strip to descend and placing the strips 57 and 58 upon a level again, thereby separating the contact member 59 from the strip 57. Thus in the movement of these parts of the mechanism, one of the contact-makers 38 on the hour wheel 36 depresses the spring 43 and causes the contact 46 to press against the contact 47. These parts are held in this condition for an appreciable interval of time, owing to the slowness of movement of the wheel 36. This makes the half hour period at which a record is to be printed. The disk 49 then permits the strip 55 to descend at one of the notches 50, thereby marking the exact minute of the half hour, and the hub 51 permits the strip 58 to descend at the exact second, whereby the precise second of a reading is accurately timed, the contact strip 57 being desirably enough longer than the contact strip 58 to hold the member 59 in contact with the strip 57 for the interval of one second.

The various contacts thus described are connected in the same circuit with one another and with a relay 61, which circuit I will call the battery or relay circuit. To such end I have shown a connecting wire or conductor 62 between the contact 46 and the strip 58, a conductor 63 between the contact 47 and the relay 61, and a conductor 64 leading from the contact strip 57 which it is understood runs to a battery, not shown, with which the relay 61 is also connected. Thus this battery or relay circuit will be automatically closed for one second at the precise instant at any half hour it is desired to make a record. The relay 61 is an ordinary form of relay having an armature 65 which operates to close contacts 66 when the relay is energized and thereby close the circuit through the solenoid 25. These contacts are connected in circuit with the solenoid 25 by means of conductors 67, 72, whereby when the relay is energized by the closure of the battery circuit, the solenoid is also energized to print automatically the recorded number of watts as indicated by the wheels 15, 16, 17 and 18. The roller 29 is connected by pinion 68 with the hour wheel 36 so as to be automatically driven by the hour wheel to feed the paper strip 28.

It will be understood that changes and modifications can be made without departing from the spirit of the invention.

What I claim is:—

1. A recording wattmeter comprising watt-integrating mechanism, recording mechanism for recording the registrations of the wattmeter, time keeping mechanism combined with means for electrically actuating the recording mechanism, and means whereby said time-keeping mechanism controls at two points said means for actuating the recording mechanism.

2. A recording wattmeter, comprising an integrating wattmeter provided with type wheels for indicating the integrations of the meter, a solenoid combined with a printing platen for coöperating with said type wheels, and a time-keeping mechanism combined with means for energizing said solenoid at predetermined periods of time.

3. A recording wattmeter, comprising an integrating wattmeter provided with type wheels to indicate the integrations of the meter, printing mechanism coöperating with said type wheels, a time-keeping mechanism, and electrically operated means for actuating said printing mechanism by said time-keeping mechanism.

4. A recording wattmeter, comprising an integrating wattmeter provided with type wheels to indicate the integrations of the meter, an electromagnet combined with a platen to coöperate with said type wheels for printing the meter integrations, a circuit including the electromagnet, a relay for closing said circuit, a battery circuit connected with said relay, and a time-keeping mechanism combined with devices for closing said battery circuit.

5. A recording wattmeter, comprising an integrating wattmeter provided with type wheels to indicate the integrations of the meter, an electromagnet combined with a platen to coöperate with said type wheels for printing the meter integrations, a circuit including the electromagnet, a relay for closing said circuit, a battery circuit connected with said relay, and a time-keeping mechanism combined with devices for closing said battery circuit at predetermined periods of time.

6. A recording wattmeter, comprising an integrating wattmeter mechanism, means for printing the integrations of the meter, an electric circuit for operating said printing means, a relay for closing said circuit, a time-keeping mechanism in combination with a battery circuit connected with said relay, said clockwork mechanism being provided with a plurality of circuit-closing devices for closing said battery circuit, one for closing the same at predetermined periods of the hour and the other for closing the same on the exact minute and second of the selected period.

7. A recording wattmeter, comprising integrating wattmeter mechanism, means for forming a record of the integrations of said mechanism, a time-keeping mechanism combined with means for operating said recording mechanism by said time-keeping mechanism, said means comprising an electric circuit and a plurality of circuit-closing devices therein actuated by the time-keeping mechanism.

8. A recording wattmeter, comprising integrating wattmeter mechanism, means for forming a record of the integrations of said mechanism, a time-keeping mechanism combined with means for operating said recording mechanism by said time-keeping mechanism, said means comprising an electric circuit and a plurality of circuit-closing devices therein actuated by the time-keeping mechanism, one of said devices being for closing said circuit at selected predetermined periods in the hour and the other being for closing the circuit at the exact minute and second of said selected period.

9. A recording wattmeter, comprising watt integrating mechanism, printing mechanism for printing the integrations of said integrating mechanism, a time-keeping mechanism combined with means for feeding paper by said time-keeping mechanism, and a relay whereby the time-keeping mechanism causes the operation of the printing mechanism at predetermined periods of time.

10. A recording wattmeter, comprising watt integrating mechanism, printing mechanism for printing the integrations of said mechanism, a time-keeping mechanism provided with means for feeding paper, an electric circuit provided with an electromagnet for actuating said printing means, a relay for closing said circuit, a battery circuit and circuit-closing devices actuated by said time-keeping mechanism, said devices comprising a twenty-four hour wheel on said mechanism, contacts closed thereby, and a minute and second wheel also carried by the mechanism and provided with contact members coöperating with both of said wheels to close the circuit at the exact minute and second of the hour period selected.

11. In a recording wattmeter, the combination of a battery circuit, a mechanism having a twenty-four hour wheel provided with adjustable contact makers 38, a minute wheel 49, having notches 50 in its periphery, a second wheel 51, having a shoulder 52, a contact-making device comprising a pivot arm 53 having a strip 55 provided with a bent end adapted to ride upon the periphery of the minute wheel 49 and to drop into the notches 50 therein, and also provided with a pair of contact strips 57 and 58, whereof the strip 58 is shorter than the strip 57 and is provided with a contact member 59 adapted to make contact with the strip 57 when the latter is higher than the strip 58, both of said strips 57 and 58 being adapted to ride upon the second wheel 51 and the shorter strip 58 being adapted to drop off the shoulder 52 while the strip 57 is still thereon, and a circuit including said contact device.

12. The combination of a minute wheel 49, having notches 50 in its periphery, a second wheel 51, having a shoulder 52, a contact-making device comprising a pivot arm 53 having a strip 55 provided with a bent end adapted to ride upon the periphery of the minute wheel 49 and to drop into the notches 50 therein, and also provided with a pair of contact strips 57 and 58, whereof the strip 58 is shorter than the strip 57 and is provided with a contact member 59 adapted to make contact with the strip 57 when the latter is higher than the strip 58, both of said strips 57 and 58 being adapted to ride upon the second wheel 51 and the shorter strip 58 being adapted to drop off the shoulder 52 while the strip 57 is still thereon, and a circuit including said contact device.

13. The combination with watt integrating mechanism provided with type wheels to indicate the integrations of said mechanism, feeding mechanism for feeding paper over said type wheels, a printing platen combined with an inking ribbon, and a solenoid combined with links 27, 27 for actuating said printing platen.

14. In combination, electricity integrating mechanism, recording mechanism, time-controlled mechanism, and electrical circuit connections controlled at two points by said time-controlled mechanism for operating said recording mechanism.

15. In combination, electricity integrating mechanism, recording mechanism, time-controlled mechanism, and circuit connections controlled at a plurality of points by said time-controlled mechanism for operating said recording mechanism, the intervals of control at different ones of said points being of different duration.

In witness whereof, I hereunto subscribe my name this 29th day of April A. D., 1907.

FRANK F. KINNEY.

Witnesses:
  A. M. BELFIELD,
  I. C. LEE.